United States Patent [19]

Robertson

[11] Patent Number: 5,022,346
[45] Date of Patent: Jun. 11, 1991

[54] BIRDFEEDER ARRANGEMENTS

[75] Inventor: John M. Robertson, Louisville, Ky.

[73] Assignee: Louisville Stoneware Inc., Louisville, Ky.

[21] Appl. No.: 306,156

[22] Filed: Feb. 6, 1989

[51] Int. Cl.$^5$ ............................................. A01K 39/00
[52] U.S. Cl. .................. 119/52.2; 119/57.8; D30/124
[58] Field of Search ............. 119/52.1, 52.2, 57.8, 119/23; D30/124–128

[56] References Cited

U.S. PATENT DOCUMENTS

| | | | |
|---|---|---|---|
| 122,264 | 9/1940 | Francine | 119/57.8 |
| 154,407 | 7/1949 | McCutcheon | D30/124 |
| 187,135 | 2/1960 | McDonald | 119/52.2 |
| 2,475,207 | 7/1949 | Smith | D30/124 |
| 4,838,205 | 6/1989 | Laison | 119/52.2 |

FOREIGN PATENT DOCUMENTS 412461 11/1966 Switzerland ................. 119/52.2

Primary Examiner—John G. Weiss
Attorney, Agent, or Firm—Edward M. Steutermann

[57] ABSTRACT

Birdfeeder arrangements for feeding birds or other animals which include an enclosure of selected configuration defining a generally vertical hopper, a cover for the hopper, and at least one opening located below the top of the hopper so that granular material placed in the hopper flows by gravity through the opening, and so material which flows out of the opening, and where a generally horizontal surface is provided immediately adjacent the outlet to receive the granular material and support the material which has flowed out of the hopper at the angle of repose of the material.

1 Claim, 3 Drawing Sheets

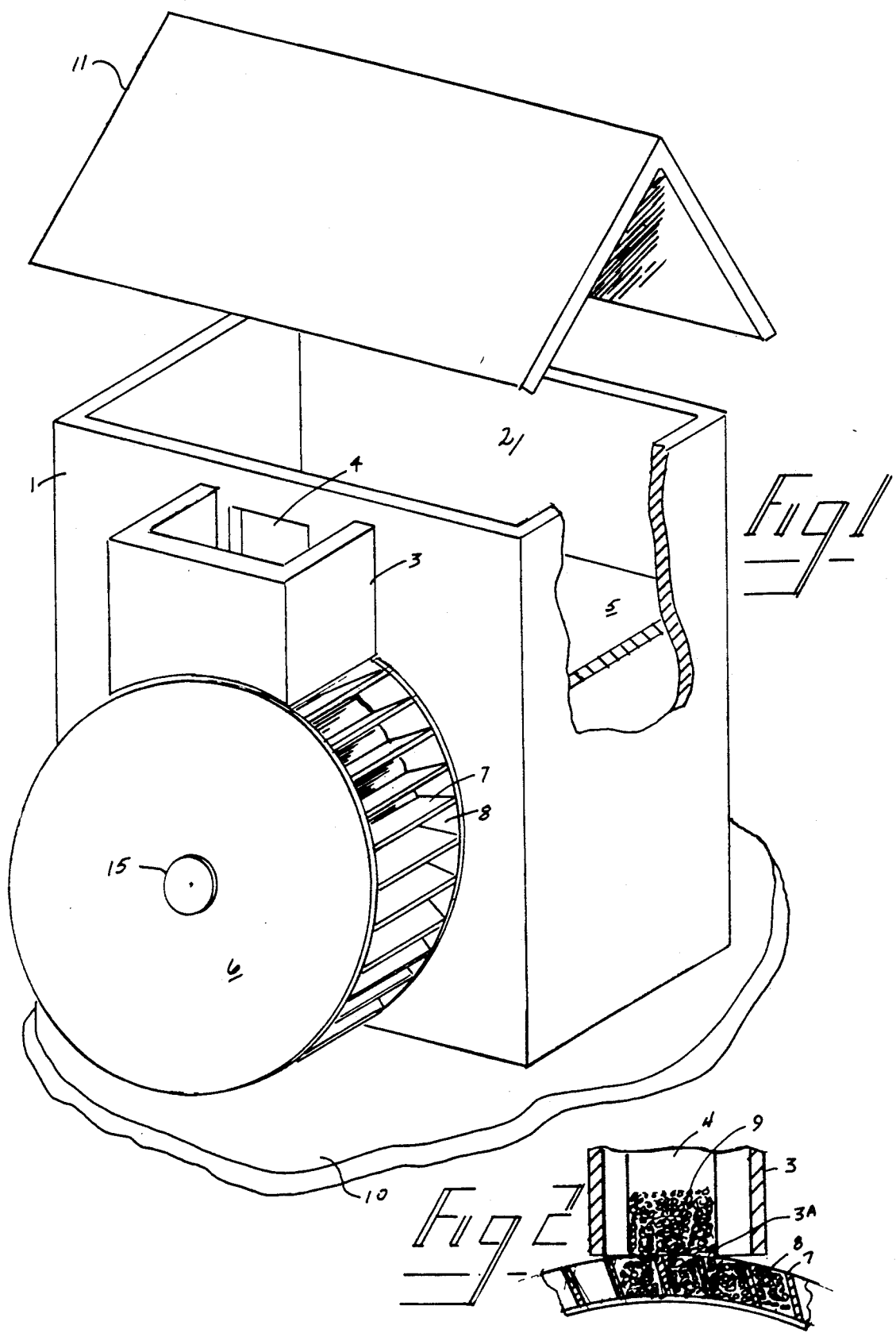

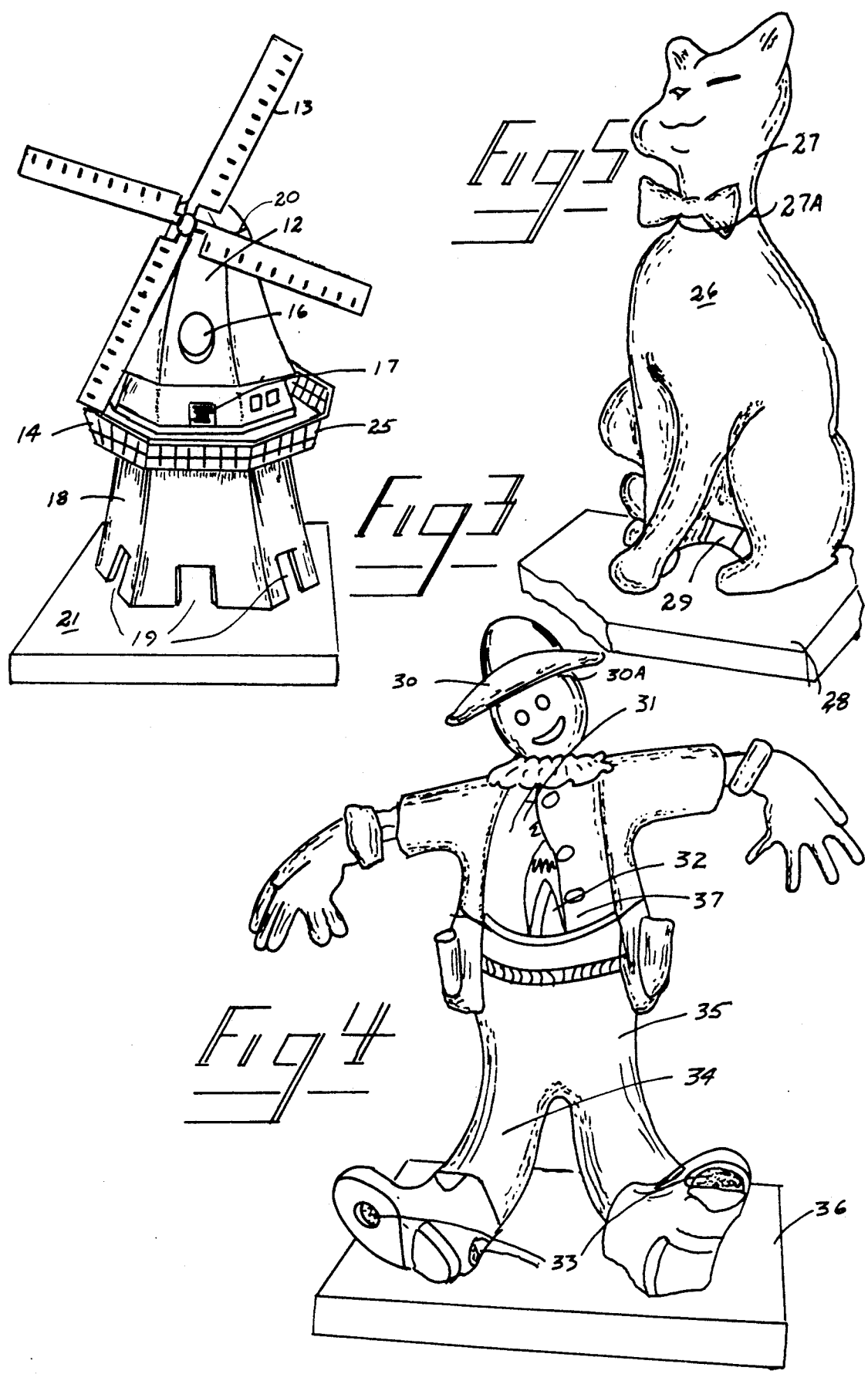

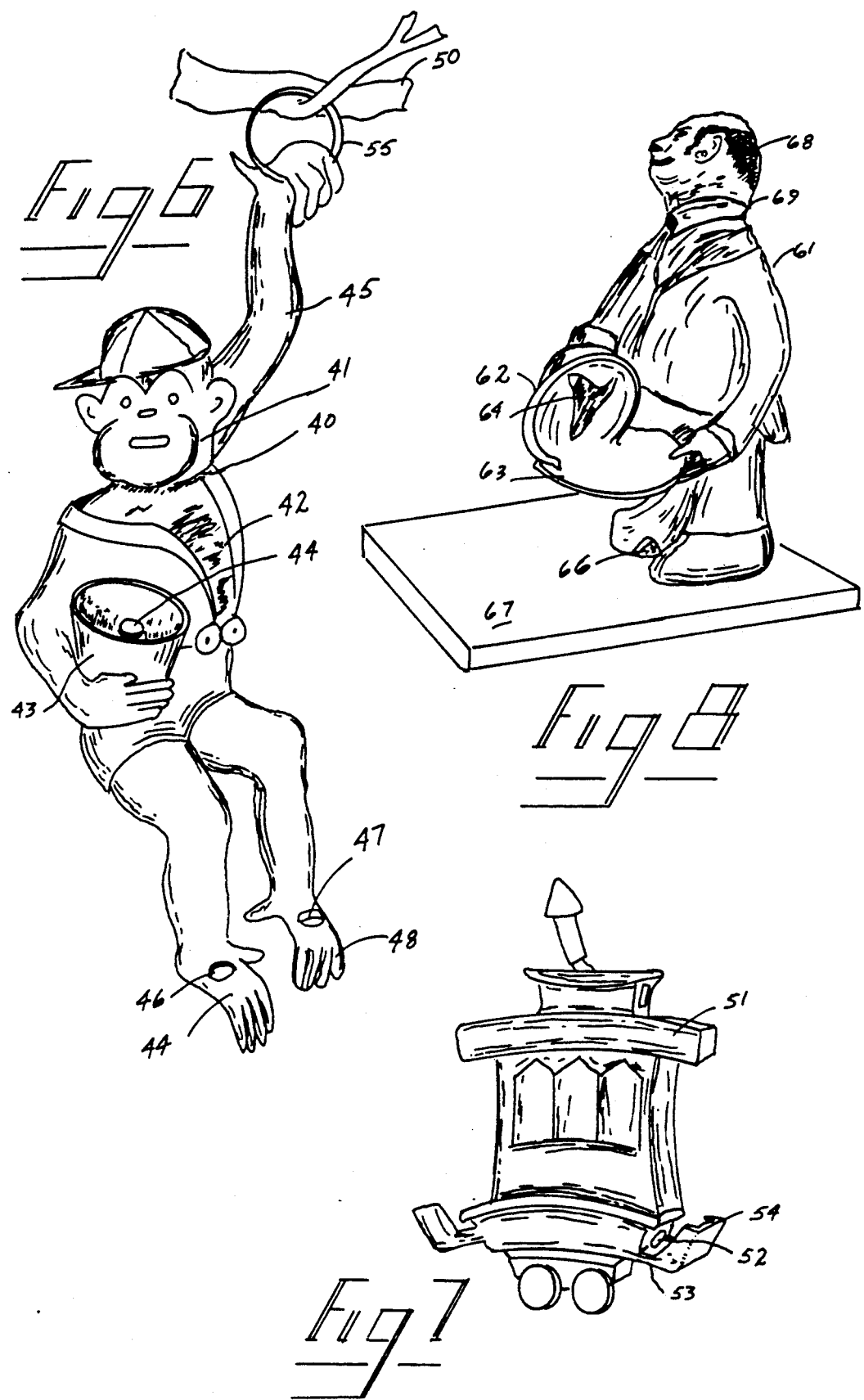

5,022,346

BIRDFEEDER ARRANGEMENTS

BACKGROUND OF THE INVENTION

This invention relates, in general, to animal feeding devices, and more particularly to devices useful as birdfeeders. Devices within the scope of the present invention are new useful, extremely attractive, and can serve as decorative items and well as utilitarian items.

In general devices within the scope of the present invention includes an enclosure which defines a generally vertical hopper where a cap is provided to cover the enclosure and an opening is provided at a location along the horizontal length of the hopper to allow the escape of granular material placed in the hopper.

Heretofore, animal feeders, and particular birdfeeders, have provided openings communicating with a hopper but have not provided such openings in statuary or other configurations which have been particularly attractive.

The prior art devices usually relate to "V" shaped hoppers having one or more openings located at the bottom to spill feed onto a feeding surface. The devices do not recognize the ability to provide attractive and appealing feeding arrangements as recognized by the present invention.

Further, devices within the scope of the present invention can provide a regulated feeding arrangement heretofore unknown in the prior art.

SUMMARY OF THE INVENTION

Devices within the scope of the present invention are particularly useful, attractive, and include the ability to disguise the character of the device as a birdfeeder as well as to regulate the flow of feed from the device.

Also, devices within the scope of the present invention can include arrangements where a hopper is provided having an outlet which communicates with a grooved rotary wheel so as feed is emitted from the hopper it fills the grooves of the rotary feeder, and thus prevents rotation of the feeder which would otherwise occur until the wheel is moved by a feeding animal such as a bird.

More particularly, birdfeeder arrangements for feeding birds and other animals which include an enclosure of selected configuration defining a generally vertical hopper, a cover for the hopper, and at least one opening located below the top of the hopper so that granular material placed in the hopper flows by gravity through the opening, and so material which flows out of the opening, and where a generally horizontal surface is provided immediately adjacent the outlet to receive the granular material and support the material which has flowed out of the hopper at the angle of repose of the material.

Various arrangements within the scope of the present invention are illustrated in the accompanying drawings and described hereinafter but it will be understood that the arrangements provided and described herein are not by way of limitation but are way of example only and that other arrangements also within the scope of the present invention will occur to those skilled in the art upon reading the disclosure set forth hereinafter.

BRIEF DESCRIPTIONS OF THE DRAWINGS

Examples of arrangements within the scope of the present invention are illustrated in the accompanying drawings wherein:

FIG. 1 is a perspective view of one arrangement within the scope of the present invention;

FIG. 2 is a partial view of a portion of the example of FIG. 1;

FIG. 3 is an illustration of a windmill birdfeeder within the scope of the present invention;

FIG. 4 is a view of a scarecrow birdfeeder within the scope of the present invention;

FIG. 5 is a view of a cat birdfeeder within the scope of the present invention;

FIG. 6 is a view of a hanging monkey birdfeeder within the scope of the present invention;

FIG. 7 is a view of a trolley birdfeeder within the scope of the present invention; and FIG. 8 is a view of a butler birdfeeder.

DETAILED DESCRIPTION OF THE DRAWINGS

Referring first to FIG. 1 which is an illustration of one arrangement within the scope of the present invention, a birdfeed enclosure 1 in the shape of a millhouse is provided which has in internal hopper 2 a floor 5 is provided within the inclosure 2 to define the hopper. An outlet 4 is provided from the hopper 2 to a housing 3 which is located over a wheel 6 which includes slat 7 defining groove 8 for receipt of granular material.

Referring to FIG. 2 the operation of the device is illustrated in cross section where the housing 3 is shown receiving the granular material 9 which drops into the grooves 8 defined by the slats 7. It has been found the hopper is mounted for rotation about a pivot 15 but it has been found that by use of the arrangement shown the granular material which is adjacent the edge 3A prevents free rotation of the wheel 6 and the wheel rotates to emit the feed only when it is moved for example by a feeding bird.

FIG. 3 is a view of another arrangement within the scope of the present invention where a windmill feeder is provided with a windmill sails 13 with and an upper housing 12 which is removable around at a separation 20. A hole 16 is provided to allow feeding directly into the top of the material held in the hopper. Additionally, an outlet 17 is provided to a baloncy 25 which provides perching on a base for emission of the granular material from the openings 17 as with the openings 19 provided in the base 18 which are received on a platform 21.

In the case of then arrangement as shown in FIG. 3 and the subsequent Figures the granular material is emitted from an opening to a generally horizontal plane so that the material is retained in the hopper except to the extent that the material is fed out of the hopper through the openings and the pile is limited by angle of repose of the material.

FIG. 4 is an illustration of yet another arrangement within the scope of the present invention where a scarecrow is provided having an upper section 31 separated from a lower section by means of a parting line 30A at the hat 30. A feed opening 32 is provided in the upper portion of the statuary to allow access to food from the top of the material located in the hopper while a second opening 33 is provided in a leg 34 which allows emission of the granular material, the leg being hollow, so that again the material is located on a platform 36 from which the birds can feed.

Referring now to FIG. 5 a cat is provided having a head 27 which is placed on a body 26 at a parting line 27A where an opening 29 is provided in the base to allow emission of the food to the platform 28. In FIG. 6 a monkey is shown has a removable head 41 which is separated from a body 42 from a parting line 40 where an arm 45 is extending upwardly and allows the device to be hung from, for example, a limb 50. The body 42 carries a pail 43 which has an aperture 44 and allows emission of the feed into the bucket for feeding.

Additionally, openings 46, 47, are provided in feet 44, 48 as shown where the feet themselves provide the perching platform for the birds and also provides a base to restrain the free emission of the grandular material from the legs of the statuary.

FIG. 7 is a trolley feeder which provides a body 51 which defines a hopper (not shown) where openings 52 are provided in the base to platform 53. Perch 54 is provided to allow feeding as shown.

FIG. 8 is a view of a butler, where a serving tray 63 is provided with a cover 62 so that the feed comes out of an opening 64 onto the tray 63. The tray 63 provides a horizontal plane to receive the food. The head 71 is removable for filling.

It will be understood that the foregoing are but a few examples of arrangements within the scope of the present invention and that various other arrangements also within the scope of the present invention will occur to those skilled in the art upon reading the disclosure set forth hereinbefore.

The invention claimed is:

1. Birdfeeder arrangement for feeding birds including an enclosure of selected configuration defining a generally vertical hopper, to receive granular material where said hopper has at least one opening means located below the top of said hopper so granular material placed in hopper flows through said hopper; second receptacle means located outwardly from said hopper to receive granular material from said opening means and having a second opening; rotary feed means is provided for rotation about a horizontal axis having compartments around the periphery thereof wherein said compartments are adapted to receive granular material from said second opening and where the said granular material is received in said compartments so that the weight of said granular material tends to turn said rotary feed means about said axis and where portions of said granular material which extend above said compartments engage the side of said second receptacle to prevent free rotation of said wheel.

* * * * *